(12) United States Patent
Mogi

(10) Patent No.: US 7,931,991 B2
(45) Date of Patent: Apr. 26, 2011

(54) FUEL CELL

(75) Inventor: Satoshi Mogi, Yamato (JP)

(73) Assignee: Canon Kabushiki Kaisha, Tokyo (JP)

( * ) Notice: Subject to any disclaimer, the term of this patent is extended or adjusted under 35 U.S.C. 154(b) by 738 days.

(21) Appl. No.: 11/950,009

(22) Filed: Dec. 4, 2007

(65) Prior Publication Data

US 2008/0152973 A1    Jun. 26, 2008

(30) Foreign Application Priority Data

Dec. 26, 2006    (JP) ................................ 2006-348978

(51) Int. Cl.
*H01M 8/04* (2006.01)
*H01M 8/10* (2006.01)
(52) U.S. Cl. .......................... 429/413; 429/444; 429/450
(58) Field of Classification Search .................. 429/413, 429/444, 450
See application file for complete search history.

(56) References Cited

U.S. PATENT DOCUMENTS 7,122,263 B2 * 10/2006 Imamura et al. .............. 429/413

FOREIGN PATENT DOCUMENTS

JP    2002-164065 A    6/2002

* cited by examiner

*Primary Examiner* — Gregg Cantelmo
(74) *Attorney, Agent, or Firm* — Fitzpatrick, Cella, Harper & Scinto

(57) ABSTRACT

There is provided a fuel cell including a fuel cell stack having a fuel cell unit provided with, in order to enable appropriately controlling a wet state before power generation efficiency of the fuel cell is reduced, a polymer electrolyte membrane having one surface thereof provided with an oxidizer electrode and another surface thereof provided with a fuel electrode. In the fuel cell: the fuel cell unit includes plural power generation cell units and a pair of wet state detection cell units; one of the pair of wet state detection cell units includes an excessively humidified state detection cell unit which is more sensitive of an excessively humidified state than the power generation cell units; and another one of the pair of wet state detection cell units includes a dry state detection cell unit which is more sensitive of a dry state than the power generation cell units.

9 Claims, 7 Drawing Sheets

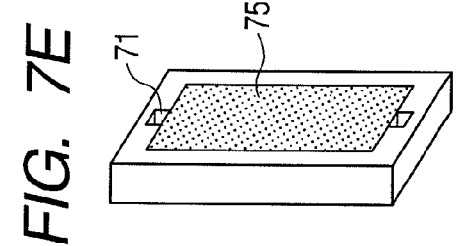
FIG. 7A
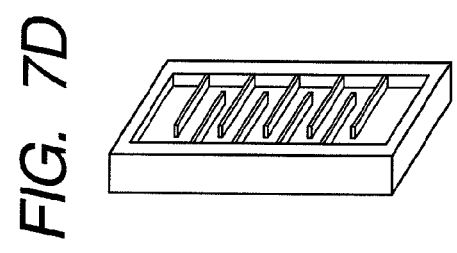
FIG. 7B
FIG. 7C
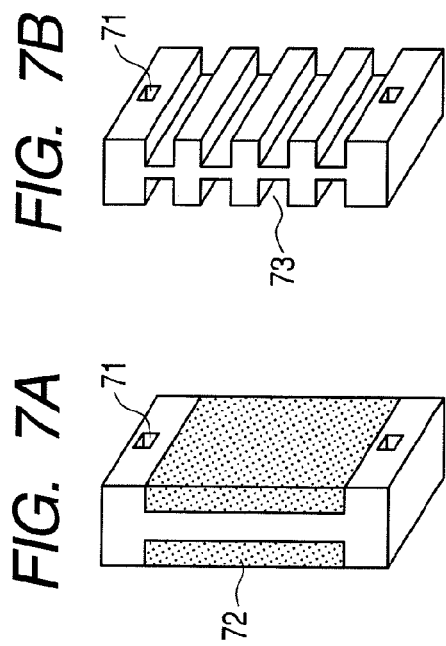
FIG. 7D
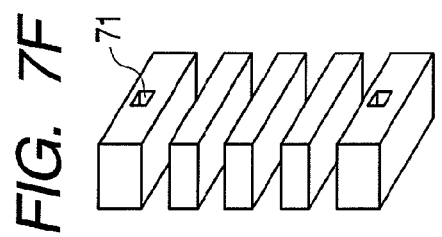
FIG. 7E
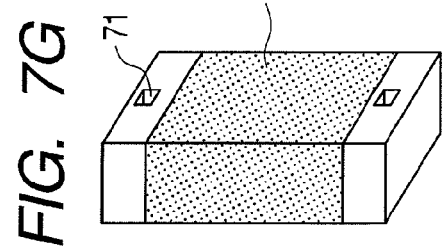
FIG. 7F
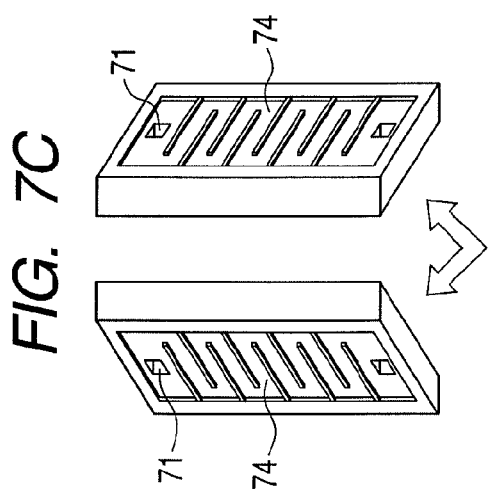
FIG. 7G

FUEL CELL

BACKGROUND OF THE INVENTION

1. Field of the Invention

The present invention relates to a fuel cell, and more particularly, to a fuel cell having a structure enabling detection of a wet state (condition) of the fuel cell.

2. Description of the Related Art

A fuel cell apparatus has a potential of realizing a suppliable energy amount per unit volume, which is several to ten times higher than that of a related art battery.

Further, by charging a fuel, a long-term continuous use is enabled, so there is expected a wide range of application, for example, to a small electronic devices such as mobile phones and notebook personal computers.

Among the fuel cell apparatuses, a polymer electrolyte fuel cell is advantageous in that it can be used at temperature close to room temperature, and in the polymer electrolyte fuel cell, an electrolyte is in a solid state instead of a liquid state, so the polymer electrolyte fuel cell can be safely carried.

In the polymer electrolyte fuel cell, a fuel cell unit has a structure in which a polymer electrolyte membrane is sandwiched between a fuel electrode and an oxidizer electrode each having a catalyst layer.

To the fuel electrode, for example, hydrogen is supplied as a fuel. To the oxidizer electrode, for example, oxygen in air is supplied as an oxidizer.

The polymer electrolyte membrane in the polymer electrolyte fuel cell contains water therein to conduct hydrogen ions.

However, ion conductivity which affects performance of the polymer electrolyte fuel cell depends on a degree of humidity of the polymer electrolyte membrane.

That is, when the polymer electrolyte membrane is too dry, the ion conductivity is remarkably reduced, thereby reducing an output of the fuel cell due to increase in internal resistance. This phenomenon is called dryout.

Accordingly, in order for the polymer electrolyte fuel cell to perform power generation, it is necessary that the polymer electrolyte membrane for conducting ions be wet to an appropriate degree.

On the other hand, the hydrogen ions which have passed through the polymer electrolyte membrane and the oxidizer (oxygen) react with each other in the oxidizer electrode, and water is generated in the oxidizer electrode.

Accordingly, moisture (water vapor) is contained in an exhaust gas of the fuel cell. When the moisture in a liquid state becomes excessive due to the generated moisture, a flow of the fuel or the oxidizer required for the fuel cell reaction is inhibited, so a stable output cannot be obtained. This phenomenon is called flooding.

Regarding those phenomena, for an operation of the fuel cell, it is necessary that the wet state be maintained appropriately. Accordingly, conventionally, Japanese Patent Application Laid-Open No. 2002-164065 suggests a fuel cell as described below as a technology of appropriately controlling the wet state of the fuel cell.

In the fuel cell, in an alignment direction of cell units constituting a fuel cell stack, relative humidity distribution is formed and a comparison is made between a voltage of the cell unit having low relative humidity and a voltage of the cell unit having high relative humidity, thereby determining the wet state of the fuel cell.

However, in the fuel cell as disclosed in Japanese Patent Application Laid-Open No. 2002-164065, in order to determine the wet state of the fuel cell, it is necessary that the humidity distribution be formed in the alignment direction of the cell units of the fuel cell stack.

As described above, with the structure in which the relative humidity distribution is formed in the alignment direction of the cell units, when determination is made such that the wet state of the fuel cell is not appropriate, reduction in power generation efficiency of the fuel cell has been already caused.

Therefore, the determination that the wet state of the fuel cell is not appropriate is made after the power generation efficiency of the fuel cell is reduced or while the power generation efficiency is being reduced. Accordingly, it is difficult to make the determination before occurrence of the reduction in power generation efficiency as described above.

For example, in a case where the relative humidity distribution is formed in the fuel cell stack with a gas inflow direction and a coolant water inflow direction being made opposite to each other, when it is determined that a sufficient wet state is not achieved, the power generation efficiency of the fuel cell unit positioned on a gas inlet side has already been reduced.

Further, in the fuel cell as disclosed in Japanese Patent Application Laid-Open No. 2002-164065, even in the fuel cell unit in which the power generation efficiency has not been reduced yet at a time when the determination is made such that the wet state of the fuel cell is not appropriate, conditions are extremely close to conditions in which the reduction in power generation efficiency is caused. Accordingly, in the related art fuel cell, in a period of time from a time at which the reduction in power generation efficiency is detected to a time at which some countermeasure is taken, there is a high risk of the power generation efficiency of more fuel cell units being reduced and the power generation efficiency of the fuel cell as a whole be reduced to a larger degree.

SUMMARY OF THE INVENTION

The present invention is directed to a fuel cell having a structure with which suitability of a wet state of the fuel cell is determined before the power generation efficiency of the fuel cell is reduced, thereby suppressing reduction in power generation efficiency to enable a supply of a stable output and appropriate control of the wet state.

That is, the present invention is directed to a fuel cell including a fuel cell stack having plural fuel cell units each having an oxidizer electrode, a fuel electrode, and a polymer electrolyte membrane interposed between the oxidizer electrode and the fuel electrode, in which: the plural fuel cell units include plural power generation cell units and a pair of wet state detection cell units; one of the pair of wet state detection cell units includes an excessively humidified state detection cell unit which is more sensitive of an excessively humidified state than the power generation cell units; and another one of the pair of wet state detection cell units includes a dry state detection cell unit which is more sensitive of a dry state than the plural power generation cell units.

According to the present invention, by determining the suitability of the wet state of the fuel cell before the power generation efficiency of the fuel cell is reduced, the stable output can be supplied by suppressing the reduction in power generation efficiency, and appropriate control of the wet state is enabled.

Further, according to the present invention, even in a case of determining the suitability of the wet state of the fuel cell after the power generation efficiency of the fuel cell is reduced, the stable output can be supplied by suppressing the power generation efficiency that is reduced further largely before a countermeasure is taken, and the appropriate control of the wet state is enabled.

Further features of the present invention will become apparent from the following description of exemplary embodiments with reference to the attached drawings.

BRIEF DESCRIPTION OF THE DRAWINGS

FIGS. 3A and 3B are views for illustrating structural examples of a separator according to the embodiment of the present invention, in which FIG. 3A is a schematic view illustrating the structural example in which a conductive porous material is disposed to form an oxidizer flow path, and FIG. 3B is a schematic view illustrating the structural example in which grooves are formed to constitute oxidizer flow paths.

FIGS. 5A, 5B, and 5C are graphs for illustrating examples of voltage distribution of cell units in the fuel cell stack according to Example 1 of the present invention, in which FIG. 5A is the graph illustrating the voltage distribution in a case where the wet state is maintained appropriately in the fuel cell stack, FIG. 5B is the graph illustrating the voltage distribution in a case where the wet state of the fuel cell stack changes to an excessively humidified state, and FIG. 5C is the graph illustrating the voltage distribution in a case where the wet state of the fuel cell stack changes to a dry state.

FIGS. 6A, 6B, 6C, and 6D are schematic views for illustrating structural examples according to Example 2 of the present invention, in which FIGS. 6A and 6C are views for illustrating examples in which a common anode electrode is provided, and FIGS. 6B and 6D are views for illustrating examples in which a common cathode electrode is provided.

FIGS. 7A, 7B, 7C, 7D, 7E, 7F, and 7G are schematic views illustrating a specific structural example of a separator illustrated in FIGS. 6A, 6B, 6C and 6D, according to Example 2 of the present invention.

DESCRIPTION OF THE EMBODIMENTS

Hereinafter, a description will be made of a fuel cell according to an embodiment of the present invention.

Figure 1:
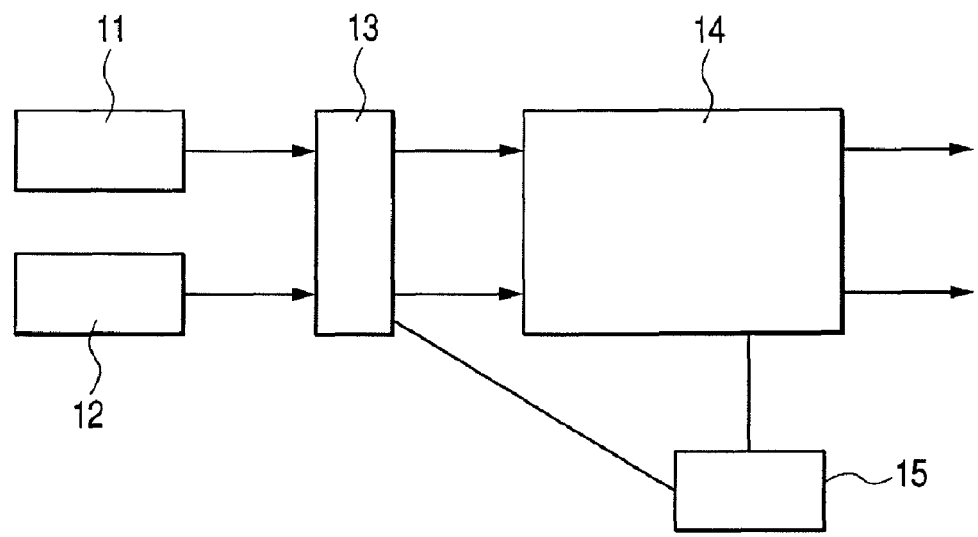
FIG. 1 is a diagram for illustrating a structure of a fuel cell apparatus according to an embodiment of the present invention.

FIG. 1 is a diagram for illustrating a structure of a fuel cell apparatus according to this embodiment.

In FIG. 1, there are illustrated a fuel supply portion 11, an oxidizer supply portion 12, a humidifier 13, a fuel cell stack 14 constituting the fuel cell, and a control device 15.

In this case, the fuel cell apparatus includes the fuel supply portion 11, the oxidizer supply portion 12, the humidifier 13, the fuel cell stack 14, and the control device 15.

The fuel supply portion 11 supplies a fuel such as hydrogen to fuel electrodes of power generation cell units of the fuel cell stack 14 constituting the fuel cell at a predetermined pressure and flow rate.

The oxidizer supply portion 12 supplies an oxidizer such as air to oxidizer electrodes of the power generation cell units of the fuel cell stack 14 constituting the fuel cell at a predetermined pressure and flow rate.

The humidifier 13 humidifies the fuel or the oxidizer as required. The control device 15 detects a wet state of the fuel cell stack and controls the humidifier.

Next, a description will be made of a fuel cell stack constituting the fuel cell according to this embodiment.

Figure 2:
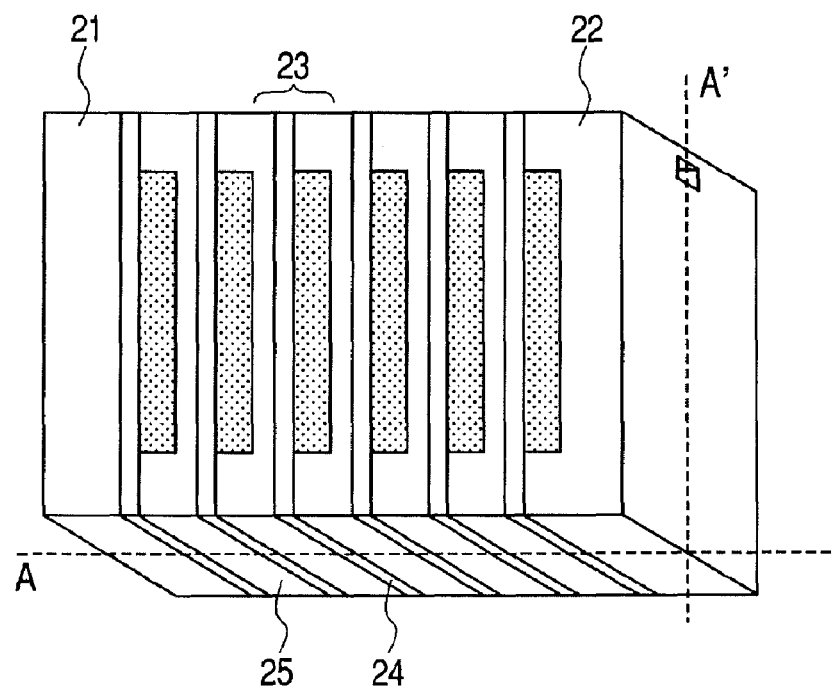
FIG. 2 is a schematic perspective view for illustrating a fuel cell stack of the fuel cell according to the embodiment of the present invention.

FIG. 2 is a perspective view for illustrating the fuel cell stack of the fuel cell according to this embodiment.

The fuel cell stack according to this embodiment includes laminated plural power generation cell units 23 and at least a pair of wet state detection cell units between a pair of end plates 21 and 22.

The end plate 21 is provided with a fuel supply port for supplying the fuel to the fuel cell stack.

The end plate 22 is appropriately provided with a fuel exhaust port for exhausting an unreacted fuel or the like from the fuel cell stack.

In FIG. 2, a membrane electrode assembly (hereinafter, referred to as MEA) including a polymer electrolyte membrane having an oxidizer electrode on one surface thereof and a fuel electrode on another surface thereof is denoted by reference numeral 24.

Plural MEAs 24 are laminated through intermediation of separators 25. Between the MEA 24 and the separator 25, there is disposed, as a gas diffusion layer, a conductive sheet such as a carbon cloth allowing reactants to pass therethrough.

Next, a further description will be made of the separator according to this embodiment.

Figure 3A:
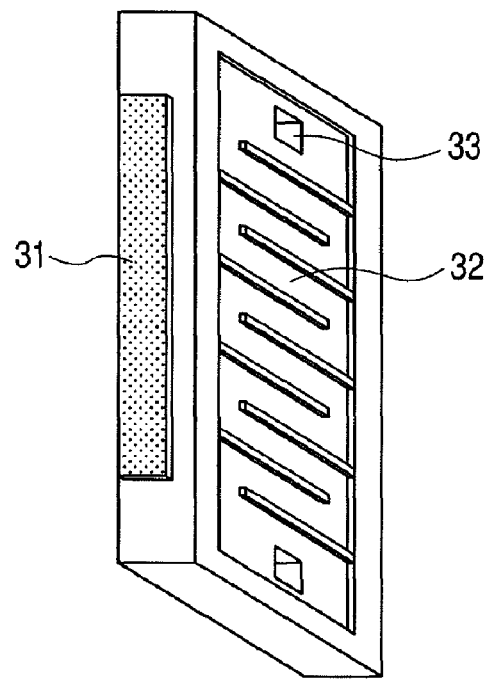
Figure 3B:
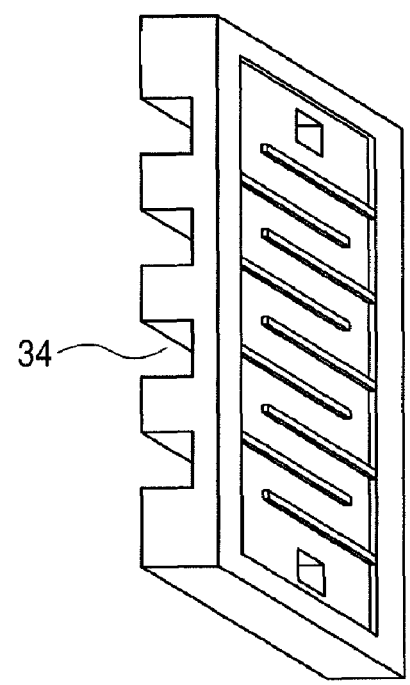

FIGS. 3A and 3B are views for illustrating structural examples of the separator according to this embodiment. On surfaces of the separator, there are formed an oxidizer flow path 31 for supplying the oxidizer to the oxidizer electrode of the MEA 24 and a fuel flow path 32 for supplying the fuel on the fuel electrode side.

An end portion of the separator is provided with a through hole 33 communicating with the fuel supply port or the fuel exhaust port.

The fuel is supplied from the fuel supply portion, humidified by the humidifier as needed, introduced to the fuel supply port, and then passes through the through hole of the separator to be supplied to the fuel electrode disposed so as to be brought into contact with the fuel flow path.

The oxidizer is supplied from the oxidizer supply portion, humidified by the humidifier as needed, and then passes through the oxidizer flow path 31 to be supplied, from this side toward backside of the figure, to the oxidizer electrode disposed so as to be brought into contact with the oxidizer flow path. As a member which can be used for the oxidizer flow path 31, there are included a member having conductivity and air permeability, a foamed metal formed of metals such as stainless steel or nickel, and a three-dimensional lattice body.

The separator is manufactured from conductive members such as conductive graphite and stainless steel.

In the separator illustrated in FIG. 3A, the conductive porous material is disposed to form the oxidizer flow path 31.

As illustrated in FIG. 3B, grooves can be formed to constitute oxidizer flow paths 34.

The pair of wet state detection cell units each have a structure which is basically the same as that of the power generation cell unit described above.

Note that, one of the pair of wet state detection cell units is more sensitive of the excessively humidified state than the power generation cell unit. That is, when the wet state detection cell unit and the power generation cell unit are put in the same excessively humidified state, an output of the wet state detection cell unit starts decreasing before an output of the power generation cell unit. In order to achieve this operation, one of the pair of wet state detection cell units is structured such that decrease in output thereof is easily caused when the power generation is performed in an excessively humidified environment (excessively humidified state detection cell unit.)

In the present invention, the term "excessively humidified state" refers to a state where an amount of moisture in the fuel cell stack is larger than that at a time of normal operation and an amount of water in a liquid state starts to increase.

The other of the pair of wet state detection cell units is more sensitive of a dry state than the power generation cell unit. That is, when the wet state detection cell unit and the power generation cell unit are put in the same dry state, an output of the wet state detection cell unit starts decreasing before an output of the power generation cell unit. In order to achieve this operation, the other of the pair of wet state detection cell units is structured such that decrease in output thereof is easily caused when the power generation is performed in a dry environment (dry state detection cell unit.)

In the present invention, the term "dry state" refers to a state where an amount of moisture in the fuel cell stack is smaller than that at a time of normal operation and an amount of water in the polymer electrolyte membrane starts to decrease.

When the wet state of the fuel cell stack changes to the excessively humidified state from the wet state at the time of normal operation, before the decrease in output of the power generation cell units and the dry state detection cell unit occurs, the output of the excessively humidified state detection cell unit decreases to be smaller than the output thereof at the time of normal operation.

Accordingly, when output voltages of the dry state detection cell unit and the excessively humidified state detection cell unit are monitored in comparison with each other, before the decrease in the output of the power generation cell units in the fuel cell stack occurs, tendency of changing to the excessively humidified state can be detected.

On the other hand, when the wet state of the fuel cell stack changes to the dry state from the wet state at the time of normal operation, before decrease in the output of the power generation cell units and the excessively humidified state detection cell unit occurs, the output of the dry state detection cell unit decreases to be smaller than the output thereof at the time of normal operation.

Accordingly, when output voltages of the dry state detection cell unit and the excessively humidified state detection cell unit are monitored in comparison with each other, before the decrease in the output of the power generation cell units in the fuel cell stack occurs, tendency of changing to the dry state can be detected.

The pair of wet state detection cell units can be realized by adjusting, for example, a thickness of an electrolyte membrane or a catalyst layer, wettability of the MEA or the gas diffusion layer, and diffusibility of the fuel or the oxidizer in the gas diffusion layer or the flow path by a method described below.

An effect imparted by those members, that is, sensitivity with respect to the change in the wet state may vary depending on a structure of the fuel cell apparatus or the fuel cell stack in some cases. Accordingly, it is desirable that the method be selected appropriately.

For example, a description will be made of a specific method which is effective for the fuel cell apparatus having a structure in which the power generation is performed by the fuel which is not humidified.

In one method, in the fuel cell apparatus having the structure in which the power generation is performed by the fuel which is not humidified, by changing the thickness of the electrolyte membrane, the sensitivity with respect to a difference in the wet state can be changed.

That is, the cell unit including the thin electrolyte membrane is sensitive of the excessively humidified state and the cell unit including the thick electrolyte membrane is sensitive of the dry state.

Accordingly, the electrolyte membrane of the excessively humidified state detection cell unit is made thinner than that of the power generation cell unit.

On the other hand, the electrolyte membrane of the dry state detection cell unit is made thicker than that of the power generation cell unit.

In a case where Nafion manufactured by DuPont is used as the electrolyte membrane, for example, N-115 (127 µm) can be selected for the power generation cell unit and N-112 (51 µm) can be selected for the excessively humidified state detection cell unit.

Further, N-117 (183 µm) can be selected for the dry state detection cell unit.

In the excessively humidified state detection cell unit, the electrolyte membrane is thin, so moisture generated in the oxidizer electrode along with the power generation tends to be inversely diffused to the fuel electrode side through the electrolyte membrane. Accordingly, in the excessively humidified state detection cell unit, an amount of the moisture which is inversely diffused is larger than that in the power generation cell unit, so flooding in the fuel electrode tends to occur in the excessively humidified state.

On the other hand, in the dry state detection cell unit, the electrolyte membrane is thick, so the moisture generated in the oxidizer electrode along with the power generation does not tend to be inversely diffused to the fuel electrode side through the electrode membrane.

Accordingly, in the dry state detection cell unit, an amount of the moisture inversely diffused is smaller than that in the power generation cell unit. In particular, in the fuel cell apparatus using hydrogen which is not humidified, dryout tends to occur in the dry state.

Further, in another method, by changing wettability of the catalyst layer, the sensitivity with respect to the difference in the wet state can be adjusted.

For example, the wettability of the oxidizer electrode catalyst layer of the excessively humidified detection cell unit is made more hydrophilic than that of the power generation cell unit. The wettability of the fuel electrode catalyst layer of the dry state detection cell unit is made more hydrophobic than that of the power generation cell unit. This is achieved by changing a PTFE content in the catalyst layer, for example. That is, the wettability of the catalyst layer is made hydrophilic when the PTFE content is reduced and is made hydrophobic when the PTFE content is increased. When water repellency of the oxidizer electrode catalyst layer is insufficient, water generated in the oxidizer electrode is not sufficiently eliminated and remains on the catalyst layer, so the flooding tends to occur. On the other hand, when the water repellency of the fuel electrode catalyst layer is too high, the generated water is not inversely diffused sufficiently, so the dryout tends to occur.

Further, in still another method, by changing the gas diffusibility in the oxidizer flow path or the like, the sensitivity with respect to the difference in the wet state can be changed.

That is, when the gas diffusibility of the flow path is low, the sensitivity with respect to the excessively humidified state is high. When the gas diffusibility is high, the sensitivity with respect to the dry state is high.

Accordingly, the gas diffusibility of the flow path of the excessively humidified state detection cell unit is set lower than that of the power generation cell unit. The gas diffusibility of the flow path of the dry state detection cell unit is set higher than that of the power generation cell unit.

This is achieved by changing porosity of the conductive porous member used for the oxidizer flow path or a shape of the groove of the flow path, for example.

For example, in a case where the foamed metal is used as the conductive porous member, the porosity is increased in an order of the excessively humidified state detection cell unit, the power generation cell unit, and the dry state detection cell unit.

When the diffusibility of the oxidizer flow path is low, the generated water cannot be sufficiently eliminated, so the flooding tends to occur.

On the other hand, when the gas diffusibility is high, humidification of the electrolyte membrane becomes insufficient, so the dryout tends to occur.

As described above, in a case where the pair of wet state detection cell units are provided, when the change is caused in the wet state in the fuel cell stack, the flooding or the dryout occurs in the wet state detection cell unit rather than in the power generation cell unit.

When the flooding or the dryout occurs, the output of one of the wet state detection cell units decreases.

Accordingly, by making a comparison between the outputs of the pair of wet state detection cell units including the excessively humidified state detection cell unit and the dry state detection cell unit, whether the wet state of the fuel cell stack is appropriately maintained can be detected.

Therefore, without complicated structure and control, by providing the pair of wet state detection cell units, before decrease in the output of the power generation cell units except for the wet state detection cell units occurs, whether the wet state is appropriately maintained can be detected.

Further, as described below, by controlling the wet state of the fuel cell stack based on detection results of the wet state, the fuel cell, in which reduction in power generation efficiency of the fuel cell stack is suppressed to minimum, can be operated in a stable manner.

In a case where the output of the excessively humidified state detection cell unit becomes lower than the output of the dry state detection cell unit, the control device determines that the fuel cell stack is excessively humidified a little, and suppresses humidification of the oxidizer by the humidifier, for example.

On the other hand, in a case where the output of the dry state detection cell unit becomes lower than the output of the excessively humidified state detection cell unit, the control device determines that the fuel cell stack is dried a little, and enhances humidification of the oxidizer by the humidifier, for example.

As a result, while suppressing decrease in the output of the power generation cell unit to the minimum, the wet state can be detected and controlled.

In this case, as the humidifier, a humidifier of a bubbler type or a spray type may be used. For example, by controlling a bubbler temperature or by controlling a spray amount, suppression and enhancement of humidification are enabled.

Further, as another method of controlling the wet state, other than the method using the humidifier, there may be performed methods of controlling stoichiometry such as a method of increasing and decreasing a flow rate of the fuel or the oxidizer or a method of increasing and decreasing the output of the fuel cell stack.

With the structure according to this embodiment, due to the reduction in power generation efficiency of only one of the pair of wet state detection cell units, the wet state of the fuel cell can be determined to be inappropriate. Accordingly, the reduction in power generation efficiency of the plural fuel cell units can be prevented.

Therefore, at the time of determining the wet state of the fuel cell, the reduction in power generation efficiency of the fuel cell stack can be suppressed, thereby enabling supply of a stable output.

Further, by changing the electrolyte membrane, the catalyst layer, or the diffusion layer of the wet state detection cell unit, the wet state can be determined. Accordingly, complicated structure and control are not necessary, such as those in a method of supplying the fuel or the oxidizer of the fuel cell stack or a method of circulating a coolant water.

Further, by adopting the structure in which a common anode or cathode electrode is shared by the pair of wet state detection cell units, through detection of voltages of electrodes which are not shared thereby, a substantial wet state of the fuel cell can be determined.

Further, by adopting a structure in which the determination can be made according to positivity/negativity of the voltage, easy control of the wet state with accuracy is enabled.

Hereinafter, descriptions will be made of examples of the present invention.

EXAMPLE 1

In Example 1, a description will be made of a fuel cell to which the present invention is applied.

Figure 4A:
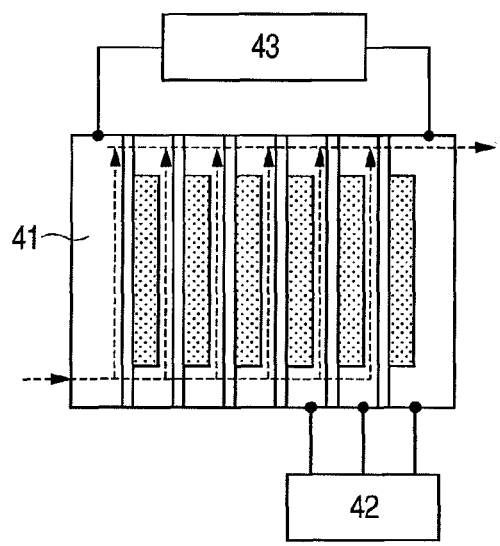
FIGS. 4A, 4B, and 4C are schematic views illustrating arrangement examples of a pair of wet state detection cell units and power generation cell units in a fuel cell stack of Example 1 of the present invention.
Figure 4B:
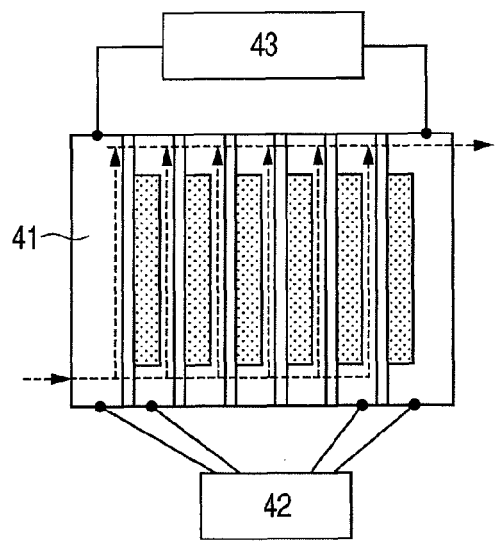
Figure 4C:
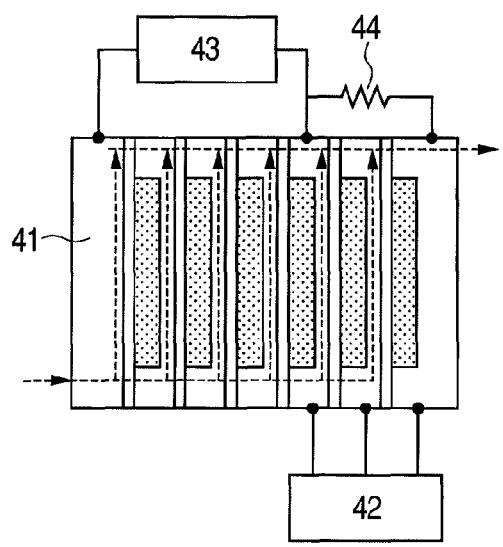

FIGS. 4A to 4C are arrangement examples of the pair of wet state detection cell units and the power generation cell units in the fuel cell stack according to this example.

In FIGS. 4A to 4C, there are illustrated a fuel cell stack 41, a control device 42, and an external load 43.

Further, arrows of each of FIGS. 4A to 4C indicate flows of the fuel in a section taken along the line A-A' of FIG. 2.

In this example, the fuel cell includes the fuel cell stack 41, the control device 42, and the external load 43.

In this case, the control device 42 is connected to the pair of wet state detection cell units.

The pair of wet state detection cell units may be formed in any position in the fuel cell stack.

That is, the pair of wet state detection cell units may be arranged so as to be adjacent to each other as illustrated in FIG. 4A.

Alternatively, the pair of wet state detection cell units may be arranged in positions away from each other in the fuel cell stack as illustrated in FIG. 4B.

In the case where the pair of wet state detection cell units are arranged so as to be adjacent to each other, the number of wirings between the control device and the wet state detection cell units can be reduced.

Further, as illustrated in FIG. 4C, there can be adopted a structure in which only the power generation cell units are connected to the external load 43 and the pair of wet state detection cell units are separately connected to a load 44.

It is desirable that setting be performed such that, when the fuel cell stack supplies electric power to the external load, an average current, which is generated by the power generation cell units, flows through the load 44.

The above-mentioned setting is performed to attain an object of making power generation states of the pair of wet state detection cell units and the power generation cell units the same. Note that, if it is ensured that the pair of wet state detection cell units react more sensitively than the power generation cell units when the wet state of the fuel cell stack changes, the object is attained even if power generation current values thereof are different from each other.

Next, in this example, a description will be made on how reduction in power generation efficiency of the fuel cell stack is suppressed.

Figure 5A:
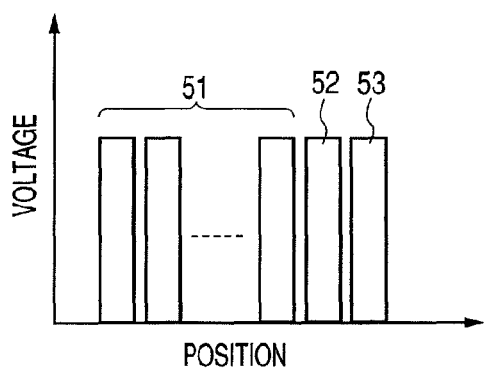
Figure 5B:
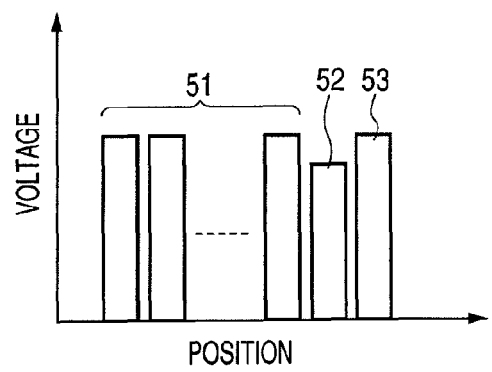
Figure 5C:
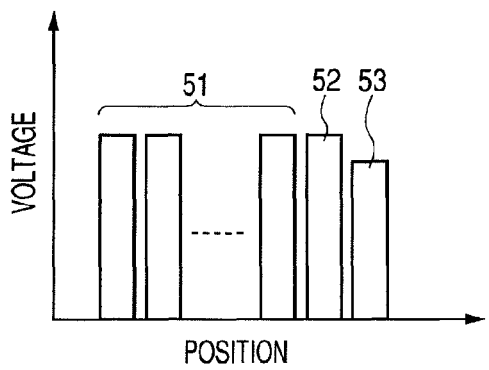

FIGS. 5A to 5C each illustrate a graph for illustrating an example of voltage distribution of the cell units in the fuel cell stack.

In FIGS. 5A to 5C, there are illustrated power generation cell units 51, output voltages 52 and 53 of the pair of wet state detection cell units, specifically, the output voltage 52 of the excessively humidified state detection cell unit and the output voltage 53 of the dry state detection cell unit.

In this case, when the wet state is appropriately maintained in the fuel cell stack, the voltage distribution as illustrated in FIG. 5A is provided.

On the other hand, when the wet state of the fuel cell stack changes to the excessively humidified state, the voltage distribution as illustrated in FIG. 5B is provided at an early stage of the change.

On the other hand, when the wet state of the fuel cell stack changes to the dry state, the voltage distribution as illustrated in FIG. 5C is provided at an early stage of the change.

As described above, at the early stage of the change in wet state of the fuel cell stack, the output of one of the pair of wet state detection cell units decreases.

However, at this time, the outputs of the power generation cell units other than the wet state detection cell units and the output of the wet state detection cell unit different from the wet state detection cell unit whose output has decreased do not change. Accordingly, by making a comparison between the outputs of the pair of wet state detection cell units and, when the change in wet state is detected, controlling the wet state by the control device 42, decrease in the output of the fuel cell can be suppressed to the minimum and the fuel cell stack can be operated in the appropriate wet state.

This example relates to the fuel cell in which the wet state detection cell units are included in series in the fuel cell stack and which supplies electric power to the external load. In the fuel cell of this example, when the change in wet state is detected, the output voltage of the fuel cell stack decreases a little. However, a measure can be taken before reduction in power generation efficiency of the power generation cell unit arranged in the vicinity of the power generation cell unit whose power generation efficiency has been reduced. Accordingly, the output voltage reduction of the fuel cell can be suppressed to the minimum. That is, the fuel cell capable of supplying a stable output can be provided.

EXAMPLE 2

Figure 6A:
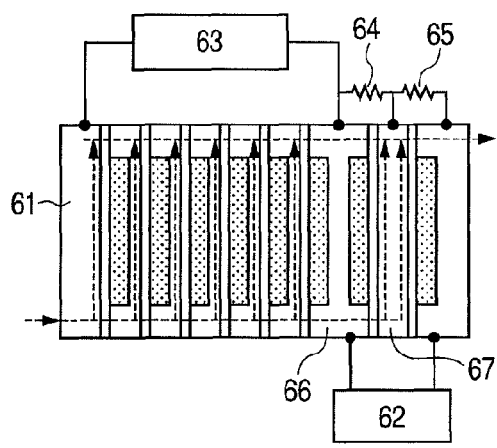

In Example 2, a description will be made of a structural example in which the pair of wet state detection cell units are arranged so as to be adjacent to each other and anode electrodes (electrodes in fuel electrodes) of the power generation cell units or cathode electrodes (electrodes in oxidizer electrodes) of the power generation cell units are connected electrically in common with each other. FIGS. 6A to 6D are views for illustrating structural examples of this example. FIGS. 6A and 6C are examples in which the anode electrodes (electrodes in fuel electrodes) are commonly provided.

Figure 6B:
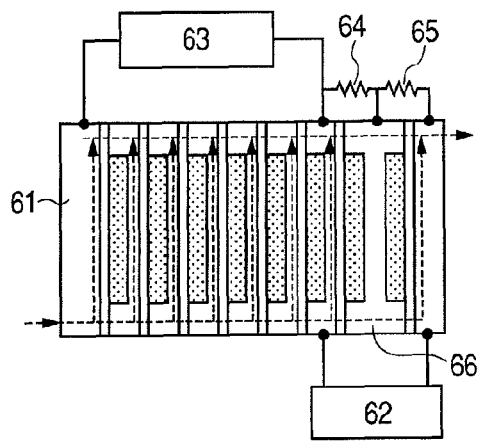
Figure 6C:
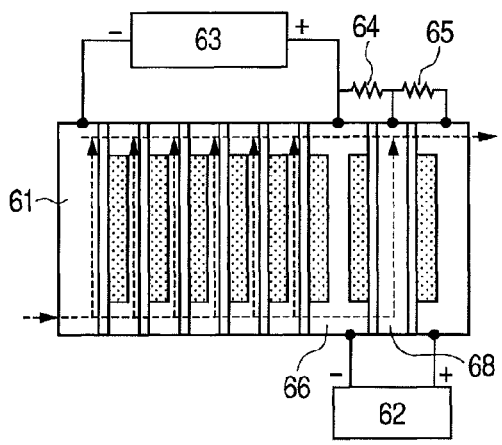
Figure 6D:
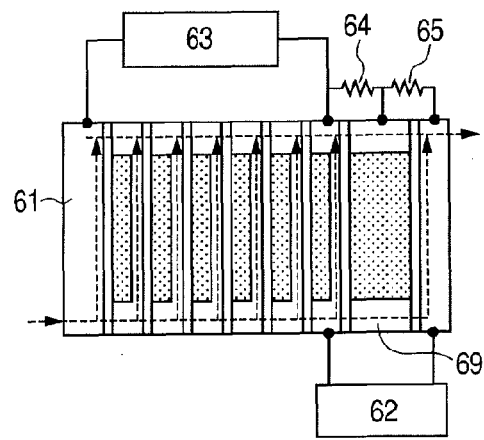

Further, FIGS. 6B and 6D are examples in which the cathode electrodes (electrodes in oxidizer electrodes) are commonly provided.

In FIGS. 6A to 6D, there are illustrated a fuel cell stack 61, a control device 62, and an external load 63.

By establishing the connection as illustrated in the structural example according to this example described above, the determination on the wet state can be made according to the voltages of the electrodes of the pair of wet state detection cell units, which are not connected electrically in common with each other.

In the case of this structural example, it is desirable that, separately from the external load 63 connected only to the power generation cell units as described above, loads 64 and 65 be connected to the pair of wet state detection cell units, respectively.

Arrows of FIGS. 6A to 6D indicate, like in FIGS. 4A to 4D, flows of the fuel in the fuel cell stack.

A series of the power generation cell units in the fuel cell stack are connected to the external load to supply electric power thereto. On the other hand, the electrodes, which are not connected electrically in common with each other, of the pair of wet state detection cell units connected to the loads 64 and 65 are subjected to detection of the voltages of the electrodes by the control device and are used to control the wet state.

In this example, the detection of the wet state of the fuel cell stack is enabled only by the voltages of two terminals, so the control device can be more simplified.

Specific structural examples of separators 66, 67, 68, and 69 illustrated in FIGS. 6A to 6D are illustrated in FIGS. 7A to 7G.

FIGS. 7A and 7B are examples of the separator, which can be used for the separator 66 of FIGS. 6A and 6B and each illustrate a structure in which oxidizer flow paths are provided on both surfaces. An end portion of the separator is provided with a through hole 71.

FIG. 7A is an example in which a conductive porous material 72 is used for the oxidizer flow path. FIG. 7B is an example in which grooves 73 are formed.

FIG. 7C is an example of a separator which can be used as the separator 67 of FIG. 6A and illustrates a structure in which fuel flow paths 74 are provided on both surfaces.

The end portion of the separator is provided with the through hole 71, and, at the same time, guides the fuel to the fuel flow paths provided to both surfaces of the separators.

In FIG. 6C, in place of the separator 67 used in FIG. 6A, the separator 68 is used.

The separator 68 has a structure in which the fuel flow path is shared by both surfaces of the separator.

For example, a separator having a structure as illustrated in FIG. 7D or 7E is applicable.

In FIG. 7E, a conductive porous material 75 is arranged so as to be brought into contact with the through hole 71, provided to the end portion of the separator, to constitute the fuel flow path.

In FIG. 6D, in place of the separator 66 used in FIG. 6B, the separator 69 is used.

The separator 69 has a structure in which the oxidizer flow path is shared by both surfaces of the separator. For example, a separator having a structure as illustrated in FIG. 7F or 7G is applicable. In FIG. 7G, a single conductive porous material 76 is used in common for the oxidizer flow path on the both surfaces.

For example, in the structure of FIG. 6C, in the pair of wet state detection cell units sharing the common fuel flow path, the wet states of the fuel can be maintained uniformly, so a difference in wet states in the oxidizer flow paths can be detected.

Further, in the structure of FIG. 6D, in the pair of wet state detection cell units sharing the common oxidizer flow path, the wet states of the oxidizer can be maintained uniformly, so a difference in wet states in the fuel flow paths can be detected.

As described above, by sharing the fuel flow path or the oxidizer flow path in the pair of wet state detection cell units, an effect on the wet state of only the oxidizer or the fuel can be detected. Accordingly, control of the wet state of the oxidizer or the fuel can be performed with high accuracy.

A description will be made of the fuel cell apparatus as illustrated in FIG. 6C, employing the fuel cell stack having the structure in which the pair of wet state detection cell units are arranged so as to be adjacent to each other, the anode electrodes (electrodes in fuel electrodes) are connected electrically in common with each other, and the common fuel flow path is shared.

In the pair of wet state detection cell units in the fuel cell stack, for example, porosities of conductive porous materials used for the oxidizer flow paths are different from each other.

That is, the porosities are selected so as to increase in an order of the excessively humidified state detection cell unit, the power generation cell unit, and the dry state detection cell unit. A foamed metal made of stainless steel manufactured by Mitsubishi Materials Corporation can be used. For example, the porosity can be selected such that the porosity of the excessively humidified state detection cell unit is 70%, the porosity of the power generation cell unit is 80%, and the porosity of the dry state detection cell unit is 90%. The load 64 connected to the excessively humidified state detection cell unit and the load 65 connected to the dry state detection cell unit are set such that an average current, supplied by the power generation cell units to the external load 63, flows therethrough.

The cathode electrodes (electrodes in oxidizer electrodes) of the pair of the wet state detection cell units are connected to the control device to detect the voltage. Based on the voltage detected by the control device, humidification of the oxidizer by the humidifier, which is provided in between an oxidizer supply path between the oxidizer supply portion and the fuel cell stack, is controlled.

EXAMPLE 3

In Example 3 of the present invention, a description will be made of detected values of the voltage in the control device and a control method for the humidifier.

Figure 8:
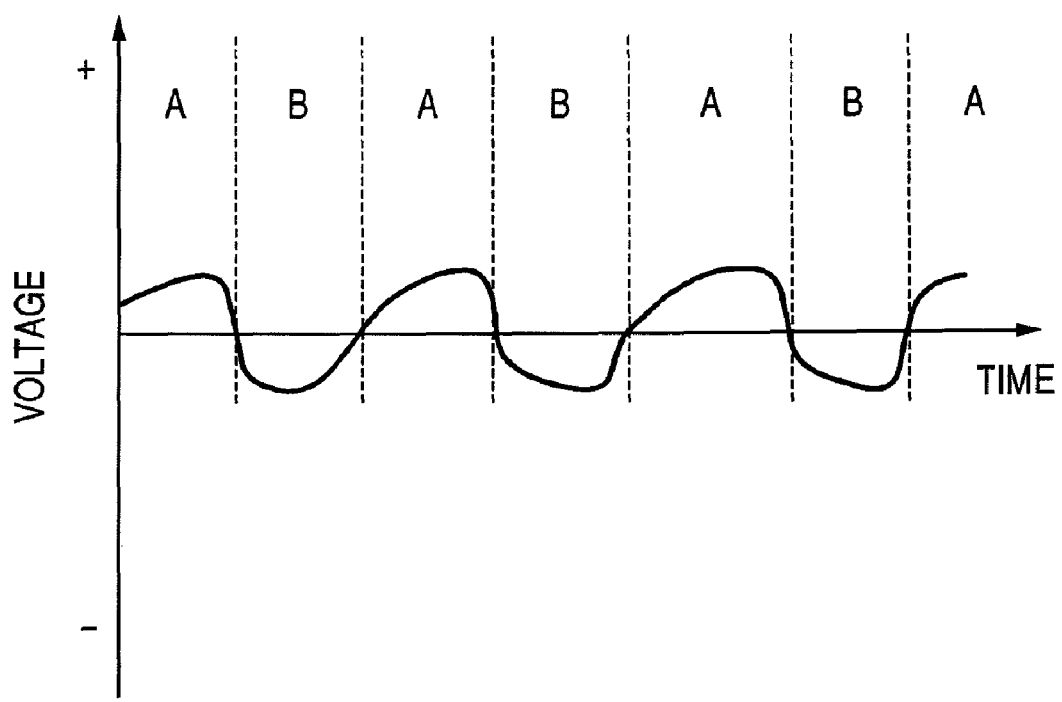
FIG. 8 is a graph illustrating a time change of detected values of a voltage in a control device during operation of the fuel cell apparatus, for illustrating Example 3 of the present invention.

FIG. 8 illustrates a time change of the detected values of the voltage in the control device during operation of the fuel cell apparatus, for illustrating this example. A polarity of the voltage is illustrated in FIG. 6C.

That is, a direction of the output voltage of the dry state detection cell unit connected to the load 65 is a positive direction.

For example, in regions A of FIG. 8, the output voltage of the dry state detection cell unit is higher than an output voltage of the excessively humidified state detection cell unit, so the fuel cell stack is determined to be excessively humidified, and the humidification of the oxidizer in the humidifier is not performed.

On the other hand, in regions B, humidification of the fuel cell stack is determined to be insufficient, so the humidification of the oxidizer in the humidifier is performed.

As described above, when the control of the wet state is performed based on the outputs of the pair of wet state detection cell units, highly accurate control, by which the reduction in outputs of the power generation cell units is suppressed to the minimum, is enabled with a simple structure.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-348978, filed Dec. 26, 2006, which is hereby incorporate by reference herein in its entirety.

What is claimed is:

1. A fuel cell, comprising a fuel cell stack including plural fuel cell units each having an oxidizer electrode, a fuel electrode, and a polymer electrolyte membrane interposed between the oxidizer electrode and the fuel electrode, wherein:
   the plural fuel cell units include plural power generation cell units and a pair of wet state detection cell units;
   one of the pair of wet state detection cell units comprises an excessively humidified state detection cell unit which is more sensitive of an excessively humidified state than the plural power generation cell units; and
   another one of the pair of wet state detection cell units comprises a dry state detection cell unit which is more sensitive of a dry state than the power generation cell units.

2. The fuel cell according to claim 1, wherein:
   the polymer electrolyte membrane of the excessively humidified state detection cell unit is thinner than the polymer electrolyte membrane of each of the power generation cell units; and
   the polymer electrolyte membrane of the dry state detection cell unit is thicker than the polymer electrolyte membrane of each of the power generation cell units.

3. The fuel cell according to claim 1, wherein:
   one of the oxidizer electrode and the fuel electrode of the excessively humidified state detection cell unit has a catalyst layer having wettability which is more hydrophilic than that of each of the power generation cell units; and
   one of the oxidizer electrode and the fuel electrode of the dry state detection cell unit has a catalyst layer having wettability which is more hydrophobic than that of each of the power generation cell units.

4. The fuel cell according to claim 1, wherein:
   one of the oxidizer electrode and the fuel electrode of the excessively humidified state detection cell unit has a flow path having gas diffusibility which is lower than that of each of the power generation cell units; and
   one of the oxidizer electrode and the fuel electrode of the dry state detection cell unit has a flow path having gas diffusibility which is higher than that of each of the power generation cell units.

5. The fuel cell according to claim 1, wherein:
   the pair of wet state detection cell units are arranged adjacent to each other in the fuel cell stack; and
   electrodes of the fuel electrodes of the wet state detection cell units or electrodes of the oxidizer electrodes of the wet state detection cell units are connected electrically in common with each other.

6. The fuel cell according to claim 1, further comprising a control device, which detects a wet state by making a comparison between voltages of the pair of wet state detection cell units, and controls the wet state based on the detection.

7. The fuel cell according to claim 6, which is electrically connected to the pair of wet state detection cell units, which are arranged adjacent to each other in the fuel cell stack, wherein the control device detects the wet state based on voltages of electrodes of the pair of wet state detection cell units, which are not connected electrically in common with each other.

8. The fuel cell according to claim 6, wherein:
the pair of wet state detection cell units are connected to a load separate from an external load connected to the power generation cell units;
the load is set so that an average current generated by the power generation cell units flows through the load.

9. The fuel cell according to claim 6, further comprising a humidifier controlled by the control device, wherein the humidifier can humidify an oxidizer to be supplied to the oxidizer electrode.

* * * * *